United States Patent [19]

Forbes

[11] Patent Number: 5,140,768
[45] Date of Patent: Aug. 25, 1992

[54] GLAZING SYSTEM, PARTICULARLY FOR GREENHOUSES

[76] Inventor: David L. Forbes, 15256 Country Ridge Dr., Chesterfield, Mo. 63017

[21] Appl. No.: 678,696

[22] Filed: Apr. 1, 1991

Related U.S. Application Data

[63] Continuation-in-part of Ser. No. 560,016, Jul. 27, 1990, which is a continuation of Ser. No. 694,227, Jan. 24, 1985, abandoned.

[51] Int. Cl.$^5$ .............................................. E04B 1/345
[52] U.S. Cl. ........................................... 47/17; 52/63
[58] Field of Search ............................. 47/17; 52/63

[56] References Cited

U.S. PATENT DOCUMENTS

| | | |
|---|---|---|
| 3,791,076 | 2/1974 | Gahler . |
| 3,899,853 | 8/1975 | Wertman . |
| 3,999,333 | 12/1976 | Amarantos . |
| 4,004,380 | 1/1977 | Kwake . |
| 4,027,437 | 6/1977 | Monsky et al. . |
| 4,068,418 | 1/1978 | Masse . |
| 4,098,035 | 7/1978 | Bessler . |
| 4,118,890 | 10/1978 | Shore . |
| 4,155,208 | 5/1979 | Shanabarger . |
| 4,317,315 | 3/1982 | LeBlang . |
| 4,352,601 | 10/1982 | Valiga . |
| 4,446,853 | 5/1984 | Adcock . |
| 4,506,688 | 3/1985 | Bethoon et al. . |

FOREIGN PATENT DOCUMENTS

| | | | |
|---|---|---|---|
| 2341017 | 9/1977 | France | 52/2.18 |
| 168928 | 10/1981 | Japan . | |
| 7004891 | 10/1970 | Netherlands . | |

OTHER PUBLICATIONS

"Alphatic Polyurethanes In Optical Applications" K. J. Quinn & Co., Inc.
"Introduction and General Information to Q-Thane Thermoplastic Polyurethane Resins", Quinn & Co.
"Film and Sheeting Materials" John Wiley & Sons, Inc., 1980.
"Elastomers, Synthetic (Thermoplastic) Thermoplastic Elastomers" John Wiley & Sons, 1979.
"Urethane Polymers" Ulrich, Henri, The Upjohn Company.
"Encyclopedia of Chemical Technology", John Wiley & Sons, Inc., 1984.
"Now Is the Time for Aliphatic Polyurethanes", Willwerth Lawrence, J.
"TPU's for Thermoprocessing", Willwerth, Lawrence J., K. J. Quinn & Company Inc.
"Q-Thane Resins for Extrusion-Physical (Mechanical) Properties".

*Primary Examiner*—Richard E. Chilcot, Jr.
*Attorney, Agent, or Firm*—Polster, Lieder, Woodruff & Lucchesi

[57] ABSTRACT

An aliphatic polyurethane film is utilized as the primary glazing material for greenhouses and other heat-gain enclosures such as pool covers and sun rooms. The film is preferably a thermoplastic aliphatic polyurethane film having good abrasion resistance, low temperature flexibility, ultraviolet resistance, and strength characteristics. Lightweight portable greenhouses and modular high-performance greenhouses are made possible by the system.

20 Claims, 3 Drawing Sheets

GLAZING SYSTEM, PARTICULARLY FOR GREENHOUSES

CROSS-REFERENCE TO RELATED APPLICATIONS

This is a continuation-in-part of pending application Ser. No. 07/560,016, filed Jul. 27, 1990, which is a continuation of application Ser. No. 06/694,227, filed Jan. 24, 1985, now abandoned.

BACKGROUND OF THE INVENTION

This invention relates to glazing systems for providing a heat gain in an enclosed space through the greenhouse effect. In such an enclosure, the glazing system permits a substantial part of the spectrum of sunlight to enter the enclosure, where it is partially converted to infrared radiation. The glazing system is relatively opaque to infrared, and therefore traps heat energy within the enclosure. The enclosure also reduces heat loss by preventing convection of air through the glazing. The glazing system of the present invention is particularly useful in novel greenhouse structures, but it may be used in numerous other structures such as swimming pool enclosures, sun rooms, cold frames, and the like. The system may be used on numerous structures having frames of wood, steel, aluminum, fiberglass, metals, or other materials, or on structures having novel frames.

Present greenhouses are glazed with glass sheet or plastic film or sheet.

Glass-glazed greenhouses were used universally until about forty years ago. They are expensive to build and operate, are subject to breakage in hail storms, and require heavy permanent footings. Although the glass glazing transmits photosynthetically active radiation (PAR) well, the framing members required to support the heavy glass reduce the overall light reaching the plants in the greenhouse. For these reasons, they are increasingly being replaced by greenhouses having a plastic film glazing.

The standard plastic being used today for greenhouse glazing is polyethylene film. The film is stapled, nailed, taped, tied, and attached by other locking systems to frames ranging from wood to steel and aluminum. Because polyethylene film is relatively inexpensive, its use has become widespread to the point of overwhelming dominance, particularly in commercial greenhouses where appearance is not a major concern.

Despite its popularity, the use of polyethylene as a glazing for greenhouses has severe disadvantages. The average life span is approximately two years. It is an inherent characteristic of the polyethylene film to begin degrading as soon as it is manufactured. Solar ultraviolet radiation causes polyethylene to discolor and to become brittle. One of the largest concerns to customers of these systems is the fear of losing one's crops. This concern is heightened by the polyethylene film's becoming less flexible and more brittle in cold weather, so that it is most likely to fail during cold, windy weather, when its failure will cause the greatest damage to the crops in it. Because of embrittlement, the film becomes very difficult or impossible to repair when damaged. The older the film, the more brittle and the more difficult to repair. Because of the discoloration due to ultraviolet rays, light transmission, and in particular PAR transmission, also diminishes and worsens with exposure and age. This has significant effects on plant growth. As the film becomes more brittle, it also loses abrasion resistance characteristics and general strength characteristics.

Because of the short life of polyethylene films, greenhouse design is now largely dictated by the necessity of changing the film glazing easily. Therefore, many features which would be desirable in a greenhouse are omitted or degraded.

The polyethylene film has a relatively high tensile modulus, but once stretched it is permanently deformed. Therefore, with time the film loses tautness and tends to flap.

Because greenhouses tend to have high internal humidity, condensation on the film tends to drip; this is detrimental to many plants and annoying for workers. Condensate droplets also may interfere seriously with the optical functioning of the greenhouse, by blocking PAR and transmitting IR. Special coatings are sometimes provided to increase sheeting of condensate and decrease dripping, but these add cost and may interfere with the optical characteristics of the film.

Polyethylene films also tend to be much more transmissive of IR than is glass. Therefore, they are not as efficient in terms of the greenhouse effect in converting sunlight to heat and trapping the heat energy.

The well-known drawbacks of polyethylene film glazing have led to intense efforts to find better glazing materials, but no commercially acceptable alternatives have been found.

Other plastic films and panels have been tried, but have not met all of the criteria of a successful greenhouse glazing such as strength, resistance to sunlight and weathering, lack of cold weather embrittlement, abrasion resistance, resistance to condensate dripping, ease of fabrication, and proper optical characteristics, such as transmission of light in the region known as photosynthetically active radiation (PAR), optical clarity in the visible region, and opacity in the infra-red (IR) region to trap heat energy. The better materials have also been very expensive. For example, among the sheet materials, acrylic is brittle and must be used in sheets having a thickness much greater than a polyethylene film. It is consequently expensive and is limited in design applications. Polystyrene degrades quickly in sunlight. Polycarbonate is even more expensive and unwieldy than acrylic. Fiberglass (glass fiber reinforced polyester or polyester/acrylic blend) discolors and has markedly inferior optical characteristics. Among the films, polyvinylchloride (PVC) must be heavily plasticized for flexibility, and the plasticizer migrates to the surface with heat and aging, where it collects dirt and diminishes light (PAR) transmission.

Although the performance of a glazing material can be estimated by measurement of its physical and optical characteristics, so many variables are involved in a real greenhouse that performance can be truly determined only by growing plants in a greenhouse using the glazing material.

SUMMARY OF THE INVENTION

One of the objects of the present invention is to provide a greenhouse glazing material that will last significantly longer than the polyethylene materials which are currently being used.

Another object of the invention is to provide such a greenhouse glazing material that will have improved low temperature flexibility.

Another object of the invention is to provide such a greenhouse glazing material that will have improved optics, particularly in transmission of PAR.

Another object of the invention is to provide such a greenhouse glazing material that will have improved strength.

Another object of this invention is to provide such a greenhouse glazing material that will have improved repairability.

Another object of the invention is to provide such a greenhouse glazing material that has improved light transmission and clarity.

Another object of the invention is to provide such a greenhouse glazing material that has improved abrasion resistance.

Another object of the invention is to provide such a greenhouse glazing material that has improved resistance to collection of condensation droplets.

Another object of the invention is to provide such a greenhouse glazing material that provides superior heat retention and that permits construction of economical, low maintenance, low operating-cost greenhouses.

Another object of the invention is to provide such a greenhouse glazing which makes possible the production of unique greenhouses having improved plant-growing abilities.

Other objects of this invention will be apparent to those skilled in the art in light of the following description and accompanying drawings.

In accordance with one aspect of this invention, generally stated, a structure is provided having a frame and improved glazing means, supported by the frame, for admitting sunlight into the structure and trapping infrared radiation within the structure to provide a heat gain within the structure. The glazing means is formed of an aliphatic polyurethane material in the form of a sheet or film.

Preferably, the aliphatic polyurethane material is formed as a flexible film of thermoplastic polyurethane. Both polyester and polyether forms of the thermoplastic aliphatic polyurethane are useable, as are mixtures of the two. The polyether is reported to have better hydrolytic stability. The polyester thermoplastic aliphatic polyurethanes, however, are greatly preferred because of their lack of tackiness, which provides a harder, more easily handled film, and because of their superior abrasion resistance and UV resistance.

The aliphatic polyurethane is not laminated to any other material through at least a substantial part of its extent and is, therefore, not merely a strengthening material in a laminated or sandwich construction. Heretofore, when aliphatic polyurethanes have been used in optical or glazing applications, they have been used as laminations or coatings with glass or plastics. In those applications, their adhesive qualities are extremely important. In the present invention, however, it is important that they not act as adhesives, but rather that they shed water and dirt, which seriously interfere with the transmission of PAR. It is also important for many aspects of the invention that the films be made in widths of three feet or greater, preferably eight feet or greater, for ease of installation and optical efficiency. Such widths require that the aliphatic thermoplastic polyurethane films be formed by processes not previously used in their manufacture.

In some embodiments, the structure is a portable tent supported by slip-fitted tubular members. In these embodiments, the glazing is a single-thickness aliphatic polyurethane film heat-bonded to a nylon body. In another embodiment, the structure is a commercial greenhouse having walls formed of tubes of aliphatic polyurethane film. The tubes are stretched to form an approximately one-inch insulative air space between the sides of the tubes. In yet another embodiment, the structure is a residential lean-to greenhouse. In yet another embodiment, advantage is taken of the surprisingly low gas permeability of the aliphatic thermoplastic polyurethanes, particularly the polyesters, and the structure is formed with both glazing and permanently inflated air tubes of the material. Air tubes having a diameter of from one to three inches have been found to provide adequate support, and also provide ideal spacing of double layer glazing.

It has been found that aliphatic polyurethanes as a class have outstanding impact and abrasion resistance, retain their flexibility at low temperature, stretch without tearing, have a memory which returns the film to its original shape after stretching, resist tearing even if punctured, have good elasticity, resist degradation caused by ultraviolet light, and have outstanding optical performance (particularly transmission of PAR, optical clarity, and blockage of IR) in a heat-gain structure such as a greenhouse. Because these qualities are built into the backbone of the polymer and are not produced by additives, they remain stable under the most severe conditions, and provide a structure with an expected useful life of many years.

Much of the chemistry and many of the physical characteristics of aliphatic polyurethanes are known, as are the characteristics of many plastic film and sheeting materials and thermoplastic polyurethanes in particular. See, for example, the Kirk-Othmer Encyclopedia of Chemical Technology, Third Edition, particularly at volume 23, pages 576–608; volume 10, pages 216–246, especially pages 216–27, 232 and 234–38; and volume 8, pages 626–40, especially pages 632–35.

Other aspects of the invention will be more readily understood in light of the following description of the preferred embodiments.

DESCRIPTION OF THE PREFERRED EMBODIMENTS

Figure 1:
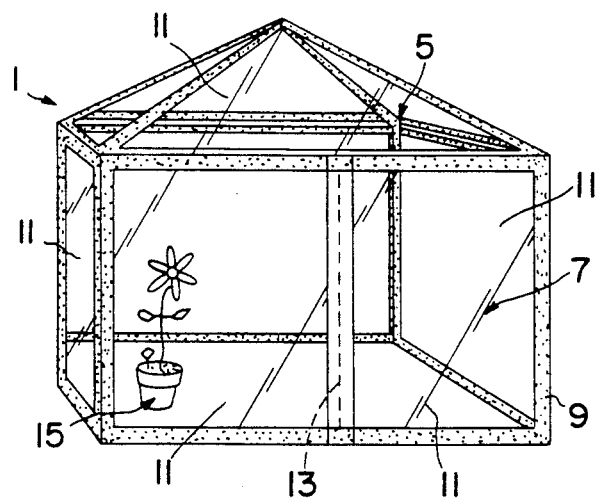
FIG. 1 is a view in perspective of a portable tent-like structure embodying an improved glazing system of the present invention, the structure having an internal frame.
Figure 2:
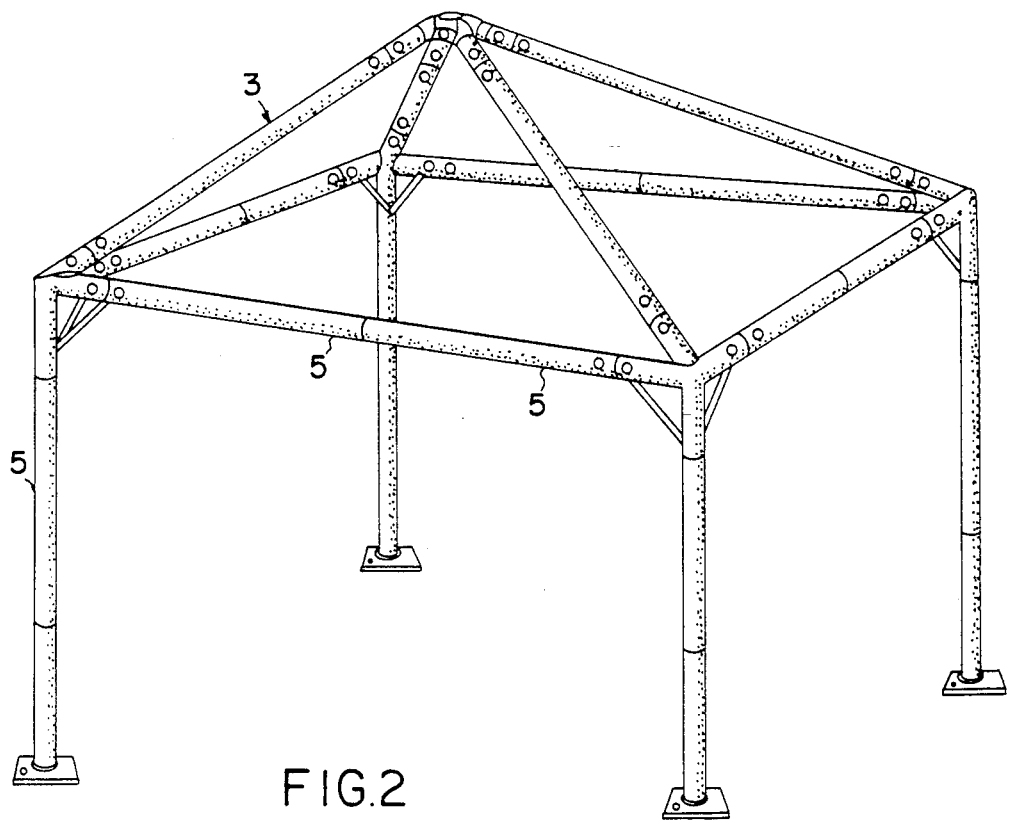
FIG. 2 is a view in perspective of a frame portion of the structure of FIG. 1.

Referring now to the drawings, and in particular to FIGS. 1 and 2, reference numeral 1 indicates a portable greenhouse embodying one illustrative example of a glazing system of the present invention. The structure 1 is in the form of a tent, having an internal frame 3 formed of slip-fitted tubes 5, and a body 7 formed of flexible sheet material. The body 7 includes an opaque or translucent portion 9 made of rip-stop nylon and large window portions 11 formed of aliphatic polyurethane film. The windows 11 form the major area of the portion of the body 7 exposed to the ambient air. A door 13 is provided in the greenhouse to provide entrance for a user of the greenhouse. The wall height of the greenhouse, and the height of the door 13, is six feet. The greenhouse is a square, ten feet on a side. The center of the greenhouse has a free height of eight feet.

It will be seen that the greenhouse 1 is a commercially available tent or screen house, with the exception that the windows 11 are formed of aliphatic polyurethane film rather than nylon screening. The aliphatic polyurethane film has a thickness of about eight thousandths of an inch. The aliphatic polyurethane film is formed from a thermoplastic polyester aliphatic polyurethane resin, sold by K.J. Quinn & Co. under the designation Q-THANE PN-03. This material is described in a brochure published by K.J. Quinn & Co. entitled "Introduction and General Information to Q-THANE Thermoplastic Polyurethane Resins." More information on the material is found in another K.J. Quinn & Co. brochure entitled "Aliphatic Polyurethanes in Optical Applications" and in an article by Lawrence J. Willworth, of K.J. Quinn & Co., entitled "Now, Is the Time for Aliphatic Polyurethanes" appearing in "Polyurethane: New Paths Prog. Mark. Technol. Proc. SPI Int. Tech./Mark. Conf. 6th", p. 288-91 (1983)."

The windows 11 are secured to the nylon portion 9 by means of a heat-sealed lap joint.

It has been found that the structure 1 is easily erected and taken down, and that it provides excellent heat gain under even severe conditions. Because it is not insulated, it loses heat at night, unless a substantial heat storage device (such as a fifty-five gallon drum two-thirds filled with water) is provided in the structure to retain heat, or unless an auxiliary heater is provided. The structure is nonetheless able to prolong the growing season considerably for plants 15 grown in it.

The windows 11 of the structure 1 have been found to endure extreme cold without embrittlement, to maintain their strength under severe conditions of heat and cold, and to resist cracking and scratching under severe thermal and mechanical stress.

Some examples of the properties which are built into the backbone of the aliphatic polyurethane PN-03 resin, including properties determined by tests run at my request, are:

| | |
|---|---|
| Abrasion resistance | Excellent |
| Color | Clear |
| Durometer | 60-95 Shore A |
| | (ASTM D-2240) |
| Tensile strength | 5000-9000 PSI |
| | (ASTM D-412) |
| Elongation | 300-600% |
| | (ASTM D-412) |
| Tear Strength | 250-800 PLI |
| (Die C) | (ASTM D-624) |
| Brittle Point | $-80°$ F. to $-100°$ F. |
| | (ASTM D-746) |
| Q.U.V. | 2000-3000 hrs. |
| Cycle: 8 hrs UV @ $50°$ C., | (Good properties, slight |
| 4 hrs condensing humidity @ $70°$ C. | yellowing at 3,000 hrs.) |
| Gas Permeability | Excellent |

Figure 3:
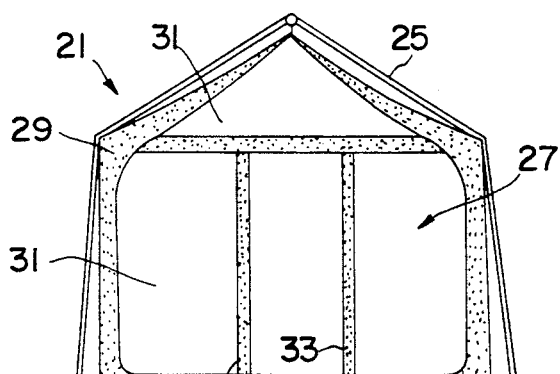
FIG. 3 is a view in front elevation of another portable tent-like structure embodying an improved glazing system of the present invention, the structure having an external frame.

The structure 21 shown in FIG. 3 is similar to that of FIG. 1 in construction and size. It has an external frame 25, supporting a sheet-material body 27. The body 27 is formed of an opaque aliphatic polyurethane portion 29 heat-bonded to a transparent aliphatic polyurethane window area 31. A door 33 is zippered on both sides, to permit the door 33 to be opened as a flap. The transparent window area 31 comprises the major portion of the body 27. The aliphatic polyurethane is a thermoplastic polyester material formed primarily of methylenebis(cyclohexyl isocyanate) ($H_{12}MDI$) and polycaprolactone. As a thermoplastic polyurethane, the material has an NCO:OH ratio no greater than one. The film thickness of the window area 31 is about ten thousandths of an inch (0.010"). This structure provides advantages of the same sort as the embodiment of FIG. 1.

Figure 4:
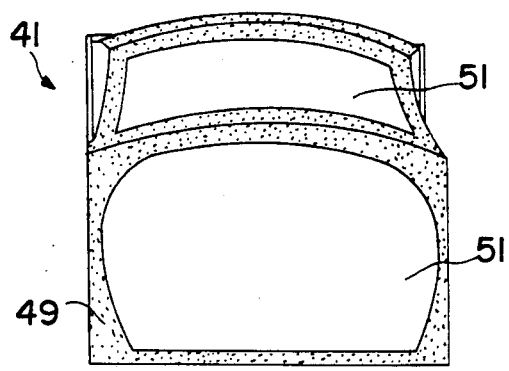
FIG. 4 is a view in side elevation of another portable tent-like structure embodying an improved glazing system of the present invention, the structure having an external frame.

The structure 41 shown in FIG. 4 is another embodiment, similar to FIG. 3, but having a somewhat different shape and support frame. The transparent aliphatic polyurethane window areas 51 of this embodiment are a five mil film sewn into an opaque nylon area 49. In this embodiment, the aliphatic polyurethane film is a polyether material based on a biuret of hexamethylene diisocyanate, having outstanding hydrolytic stability, but less resistance to impact and abrasion, and less resistance to ultraviolet exposure. The structure 41 has less desirable qualities than the structures 1 and 21 of FIG. 1 and FIG. 3, respectively, but is nonetheless superior to greenhouses with presently known glazing systems.

Figure 6:
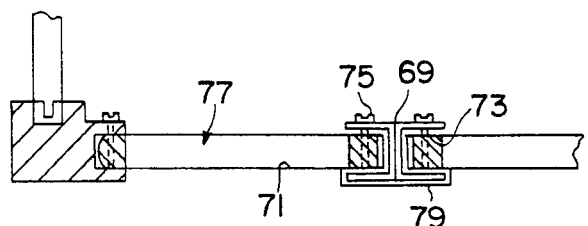
FIG. 6 is a cross-sectional view taken along the line 6—6 of FIG. 5.
Figure 5:
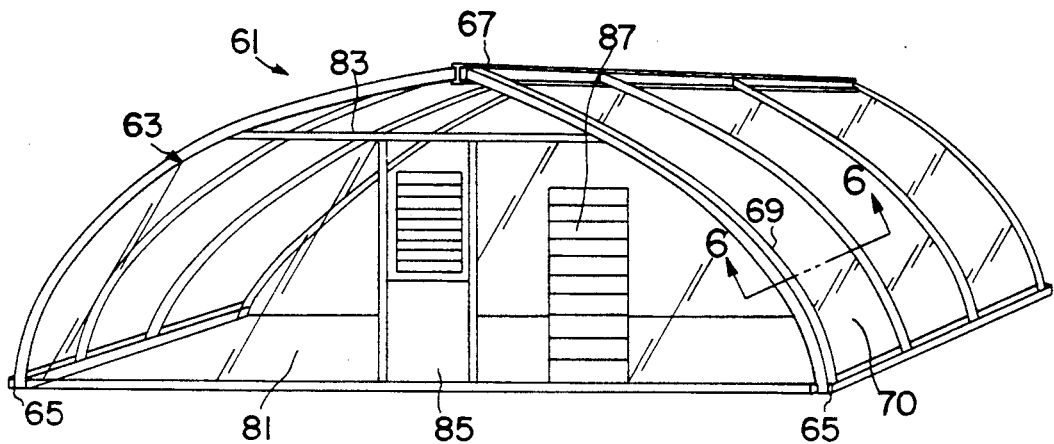
FIG. 5 is a view in perspective of a commercial greenhouse structure embodying an improved glazing system of the present invention.

The structure 61 of FIGS. 5 and 6 is a commercial greenhouse, which may also have residential use. The structure 61 includes a frame 63 including longitudinally extending ground tracks 65, a ridge track 67, and arcuate uprights 69 slidably mounted in the tracks 65 and 67. The ridge track is positioned at a nine-foot height. The arcuate uprights 69 are spaced apart by top and bottom spacers, not shown, to form modules 70 four feet in length. As best shown in FIG. 6, the uprights 69 carry between them a vertical tube 71 formed of an aliphatic polyurethane film. Ribs 73 are slipped into the tube 71, and the tube 71 is stretched between uprights 69. Fasteners 75 extending through the tube 71 and the ribs 73 connect the tube 71 to the uprights 69, with the broad sides of the tube spaced apart one inch, to provide an insulating air gap 77 between the two layers of the film. Each four-foot long modular section 70 is slipped into the tracks 65 and 67 and moved along the tracks into a tight fit with the abutting module 70. Locking plates 79 hold the abutting modules together. The number of modules 70 is chosen to provide the desired length of the greenhouse 61, which may typically be from twelve feet to two hundred feet.

At each end of the structure 61, an end wall 81 is attached to the uprights 69. Each end wall 81 is formed of a frame 83 and a two layers of aliphatic polyurethane film. The two layers of film are separated by one inch from each other by the frame 83. A jalousied door 85 provides access to the greenhouse 61. A power ventilator 87 at each end of the greenhouse 61 provides air flow through the structure, to help control temperature.

The aliphatic polyurethane film of this embodiment is an eight mil Q-THANE P-3429 thermoplastic polyester aliphatic polyurethane. The P-3429 material is comparable to PN-03 in optical characteristics, has a somewhat higher tensile strength, and has a somewhat lower 100% and 300% modulus. The film has been tested and found to have substantially greater transmittance of PAR than a comparable polyethylene film. It has a tensile strength, tear resistance, dart impact resistance, and abrasion resistance all of which are several times greater than the polyethylene film.

The tube portions are conveniently formed by blown-bubble extrusion molding, formed into rolls without slitting. The blown-bubble extrusion technique is well known in the plastics extrusion art. It is not believed to have been used previously, however, with aliphatic polyurethane. The use of this technique enables production of films of indeterminate length and a width of several feet. These dimensions permit the film to be used in greenhouse applications.

This embodiment provides a highly energy-efficient construction at an installed cost substantially less than a glass greenhouse, yet has an energy efficiency and life expectancy at least equal to a double-glazed glass greenhouse. The structure can easily be constructed to building codes, without requiring heavy foundations or footings.

Figure 7:
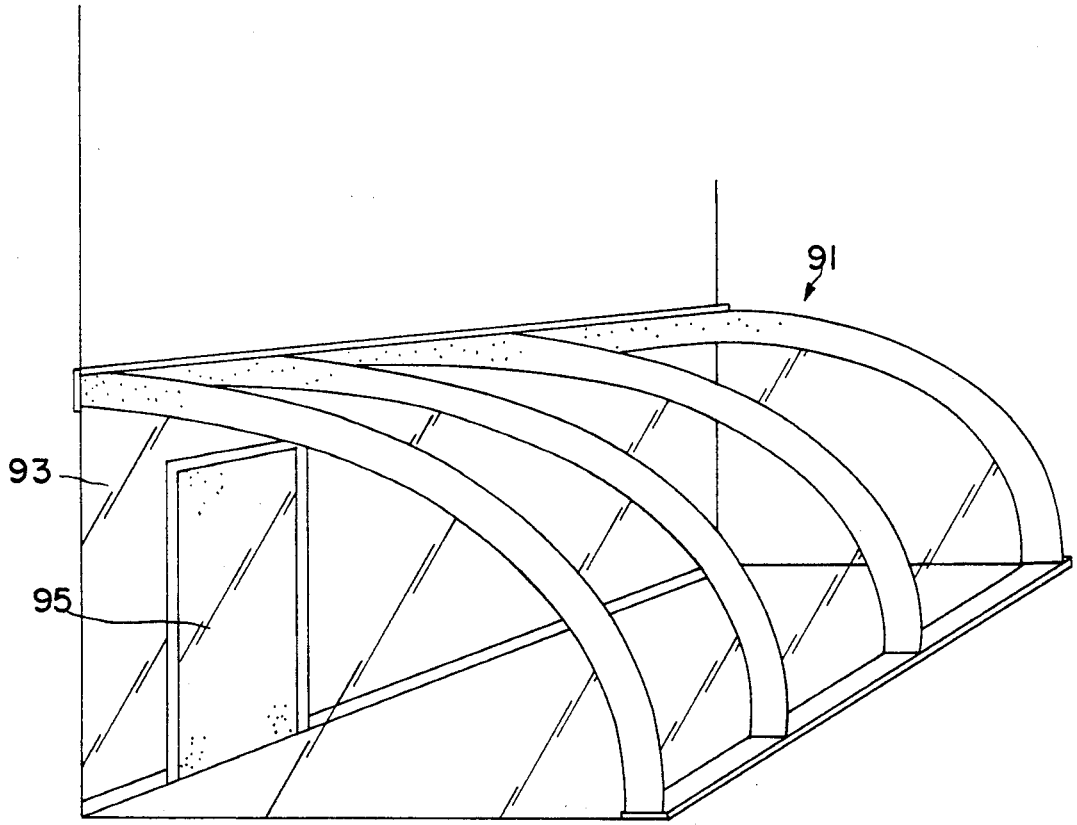
FIG. 7 is a view in perspective of a lean-to greenhouse structure embodying an improved glazing system of the present invention.

The embodiment of FIG. 7 is a lean-to greenhouse 91 for installation against a building wall 93. It is similar to the structure of FIGS. 5 and 6, but includes only one side of the structure of that embodiment. It will be seen that access to the structure 91 is through a door 95 in wall 93. It will also be seen that, although the wall 93 is generally opaque, nearly the entire surface of the greenhouse 91 which is exposed to the ambient atmosphere is formed of the transparent aliphatic polyurethane.

Numerous variations in the glazing system of the present invention, within the scope of the appended claims, will occur to those skilled in the art in light of the foregoing disclosure. For example, the thickness of the aliphatic polyurethane film may be varied considerably. Not only polyester thermoplastic aliphatic polyurethanes may be used, but also polyether thermoplastic aliphatic polyurethanes and coextrusions of the two. For some applications, the polyurethane may be alloyed with other polymers to provide advantages of both; for example, a harder material may be provided by alloying with a polymethyl methacrylate (acrylic).

Figure 8:
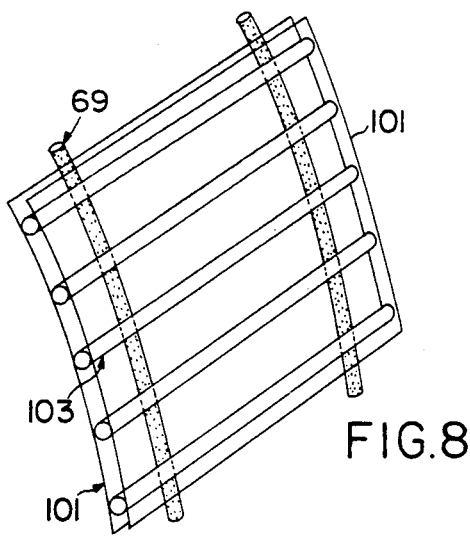
FIG. 8 is a detail in perspective of a modified wall portion for the greenhouse of FIGS. 5 and 6.

The shapes and constructions of the structures may be varied within wide limits. For example, as shown in FIG. 8, the glazing of the greenhouse of FIG. 5 may be a blanket formed by two sheets of aliphatic polyurethane film 101 separated by horizontal tubes 103 formed of aliphatic polyurethane. The tubes 103 take the place of some or all of the opaque purlins commonly required in greenhouse construction. The tubes 103 are preferably heat-sealed to the films 101 on one-foot centers. Alternatively, the tubes may be formed by gathering the sheets 101 to form tubes, and heat sealing or securing with adhesive along the gather lines. The tubes 103 are filled with air and sealed, to separate the films by the diameter of the tubes 103, preferably about 1.5″+/−0.75″. Inflation of the tubes may take place at the factory or at the greenhouse site. Because the tubes 103 are highly gas impermeable, they remain inflated for extended periods, without requiring the air blower commonly used to separate the sheets of polyethylene in a standard greenhouse. Therefore, the air space between the sheets 101 is "dead" and the insulative properties of the covering are greatly enhanced; the enhanced insulation also reduces condensation on the blanket. The tubes 103 also provide cells in the blanket, thereby reducing convective air movement. Because the permanently inflated tubes 103 provide the stiffening of the blanket, the insulative spacing is not dependent on a blower, and the cost of operation is also reduced. Moreover, the blanket may be rolled up from the ground to provide ventilation if desired. By heat sealing individual aliphatic polyethylene sheets together to form a continuous cell of ten or more feet in horizontal length, this construction permits shading material to be inserted between tubes 103 and moved across individual cells horizontally, to provide selective shading. Either sheet material shades or other shades, such as blown beads, may be used. In this embodiment, another set of horizontal tubes 103 may be added to the outer surface of the blanket, between the original set of tubes 103, and a third layer of film 101 may be sealed to the second set of tubes, to provide a triple layer of film.

The large diameter tubing used for overhead forced air heating and ventilating in greenhouses may also be formed of aliphatic polyurethane, to avoid the shading effect caused as the conventional polyethylene tubing discolors.

Shading may be printed directly on the film, or the surface of the film may be treated to provide less reflective loss, more diffusion, or other desired optical characteristics.

The structures may be used for a wide variety of heat-gain purposes other than greenhouses, such as sun rooms, pool enclosures, or passive solar collectors.

These variations are merely illustrative.

I claim:

1. A method of growing plants comprising enclosing the plants in a greenhouse glazed with a thermoplastic aliphatic polyester polyurethane glazing having a substantially higher transmittance of photosynthetically active radiation than polyethylene of the same thickness, and exposing the plants to sunlight through the glazing, the aliphatic polyurethane glazing being the major optical barrier between the sunlight and the plants.

2. The method of claim 1 wherein the glazing comprises plural films of aliphatic polyurethane, and including a step of separating the films with aliphatic polyurethane tubes filled with static gas, the films and the tubes being bonded into a unitary sealed structure.

3. The method of claim 1 including a step of forming the aliphatic polyurethane into a film by blown-bubble extrusion molding.

4. In a structure having a frame and glazing means, supported by said frame, for admitting sunlight into said structure and trapping infra-red radiation within said structure to provide a heat gain within said structure, the improvement wherein said glazing means is formed of an aliphatic polyurethane material, unlaminated to any other material through at least a substantial part of its extent, the aliphatic polyurethane material having a substantially higher transmittance of photosynthetically active radiation than polyethylene of the same thickness.

5. The improvement of claim 4 wherein said aliphatic polyurethane material is formed as a flexible sheet.

6. The improvement of claim 4 wherein said aliphatic polyurethane material is a thermoplastic polyester polyurethane.

7. The improvement of claim 6 wherein said aliphatic polyurethane material is a film having a thickness of from two to eight mils.

8. The improvement of claim 5 wherein said aliphatic polyurethane material is a film having a thickness of from one to twenty mils.

9. The improvement of claim 8 wherein said glazing means forms at least a major part of a tent carried by slip-fitted tubular members.

10. The improvement of claim 4 wherein said structure includes at least one door for human entrance into said enclosure, said structure having a clear height of at least six feet.

11. The improvement of claim 10 wherein said aliphatic polyurethane sheet material is a pair of films separated by a plurality of air tubes, each of the air tubes having a diameter of 1.5"+/−0.75", each of the air tubes being filled with air in a static state, the films and the tubes being bonded into a unitary sealed structure.

12. The improvement of claim 11 wherein said structure is a greenhouse having plants growing within it, the air tubes extending substantially horizontally to define horizontal cells having an open length of several feet.

13. In an enclosure comprising a frame supporting said enclosure on the earth and glazing means supported by said frame for admitting sunlight into said enclosure and trapping infra-red radiation within said enclosure to provide a heat gain within said enclosure, said glazing means comprising the major portion of the exposed surface area of said enclosure, the improvement wherein said glazing means comprises an aliphatic polyurethane sheet material, the aliphatic polyurethane sheet material having a substantially higher transmittance of photosynthetically active radiation than polyethylene of the same thickness.

14. The improvement of claim 13 wherein said aliphatic polyurethane sheet material is unlaminated to any other material through at least a substantial part of its extent.

15. The improvement of claim 14 wherein said glazing means comprises two layers of said aliphatic polyurethane sheet material separated by an insulative fluid.

16. The improvement of claim 15 wherein said insulative fluid is air.

17. The improvement of claim 16 wherein said aliphatic polyurethane sheet material is a film formed as a tube, said tube being stretched to form an air space between sides of the tube on the order of one half inch to two inches.

18. The improvement of claim 13 wherein said enclosure includes at least one door for human entrance into said enclosure, said enclosure having a clear height of at least six feet.

19. The improvement of claim 13 wherein said aliphatic polyurethane sheet material is a pair of films separated by a plurality of air tubes, each of the air tubes having a diameter of 1.5"+/−0.75", each of the air tubes being filled with air in a static state.

20. The improvement of claim 19 wherein said enclosure is a greenhouse having plants growing within it.

* * * * *